(12) United States Patent
Zibafar

(10) Patent No.: US 8,936,506 B2
(45) Date of Patent: Jan. 20, 2015

(54) WIND-POWERED VENTILATOR THAT CREATES POSITIVE AND NEGATIVE PRESSURES

(76) Inventor: Javad Zibafar, Tehran (IR)

( * ) Notice: Subject to any disclaimer, the term of this patent is extended or adjusted under 35 U.S.C. 154(b) by 1435 days.

(21) Appl. No.: 12/581,117

(22) Filed: Oct. 17, 2009

(65) Prior Publication Data

US 2011/0092148 A1 Apr. 21, 2011

(51) Int. Cl.
*F23L 17/02* (2006.01)
(52) U.S. Cl.
CPC ............... *F23L 17/02* (2013.01); *Y02B 10/30* (2013.01); *Y02B 10/70* (2013.01); *Y02E 10/725* (2013.01)
USPC ............................................. 454/11; 454/17
(58) Field of Classification Search
CPC ................................. Y02B 10/30; F23L 17/02
USPC .................. 454/9, 17, 22–24; 114/211
See application file for complete search history.

(56) References Cited

U.S. PATENT DOCUMENTS

| | | | |
|---|---|---|---|
| 254,360 A * | 2/1882 | Moore | 454/11 |
| 920,621 A * | 5/1909 | Neiburger | 454/24 |
| 1,100,234 A | 6/1914 | Ecker | |
| 1,112,251 A * | 9/1914 | Bicalky | 454/11 |
| 1,298,671 A * | 4/1919 | Crampton | 454/22 |
| 1,561,006 A * | 11/1925 | McNutt | 454/22 |
| 1,831,189 A * | 11/1931 | Obermark | 454/22 |
| 1,862,213 A * | 6/1932 | Emisch | 454/22 |
| 2,351,794 A * | 6/1944 | Weller | 454/23 |
| 3,661,070 A | 5/1972 | Miller | |
| D247,250 S | 2/1978 | Miller | |
| 4,310,122 A * | 1/1982 | Vikre | 239/502 |
| 6,500,061 B1 * | 12/2002 | Ambrose | 454/9 |

OTHER PUBLICATIONS http://www.imaging.me.jhu.edu/PDF/327lec-drag.pdf; 530.327—Introduction to Fluid Mechanics—Su—Boundary layers: Pressure gradients and separation; Mar. 8, 2005.*
Holmes, JD, PS Jackson, W.H. Melbourne; Wind Engineering 1983 3B, Proceedings of the sixth international Conference, Published by Burlington: Elsevier Science, 1984.*
Cengel, Y and J. Cimbala; Fluid Mechanics Fundamentals and Applications, Chapter 9, McGraw-Hill, © 2006.*
Marshall, J and R. Evans, "Rivulet Dynamics with Variable Gravity and Wind Shear", IIHR—Hydroscience & Engineering, College of Engineering, The University of Iowa, Iowa City, IA, Nov. 2004.*
Dundage, M., R.O. Bhagwat, S. Chavan, Numerical Modeling of Wind Patterns around Solar Parabolic Trough Collector, International Journal of Modern Engineering Research, vol. 3, Issue 5, Jul.-Aug. 2013 pp. 217-2132.*

(Continued)

*Primary Examiner* — Steven B McAllister
*Assistant Examiner* — Frances H Kamps

(57) ABSTRACT

A wind-powered rooftop ventilator that can create both positive and negative pressures to enable the exhaust and intake of air is described. The wind-powered rooftop ventilator includes a symmetrical cap that is aerodynamically shaped such that, when wind flows against the back of the symmetrical cap, a negative pressure area is created at the front opening of the symmetrical cap, thereby enabling the exhaust of air from an indoor area. When wind flows against the front opening of the symmetrical cap, the wind is captured by the symmetrical cap, thereby enabling the intake of air into an indoor area. As such, the wind-powered rooftop ventilator can create both positive and negative pressures without use of an external power source, fan, and/or worm gear.

10 Claims, 5 Drawing Sheets

(56) References Cited

OTHER PUBLICATIONS

Dipankar Chatterjee, Kanchan Chatterjee and Bittagopal Mondal; Control of Flow Separation, Journal of Fluids Engineering, vol. 134, Issue 9, Flows in Complex Systems, Aug. 2012.*

L. Ristroph, M. Moore, S. Childress, M. Shelley, J. Zhang, Sculpting of an erodible body by flowing water, Applied Mathematics Laboratory, Courant Institute, New York University, New York, NY 10012; and Department of Physics, New York University, New York, NY 10003.* internet archive.org.*

Naeeni, A. and M. Yaghoubi, Analysis of wind flow around a parabolic collector (1) fluid flow, Engineering school, Shiraz University, Academy of Sciences, Shiraz, Iran, Science Direct, Elsevier LTD, Dec. 2006.*

\* cited by examiner

WIND-POWERED VENTILATOR THAT CREATES POSITIVE AND NEGATIVE PRESSURES

TECHNICAL FIELD

This application generally relates to ventilators, and more particularly relates to a rooftop wind-powered ventilator that can create both positive and negative pressures.

BACKGROUND

Conventional rooftop ventilators are used to exhaust hot, unpleasant, and/or turbid gases from indoor areas, such as, for example, bathrooms, kitchens, and industrial workspaces, and allow for air circulation. Ventilation of such gases is especially desirable for the removal of moisture build-up to prevent the rotting of a building's structural members and growth of germs. Conventionally, rooftop ventilators have been unsightly, and have further served as nesting places for birds and insects. In addition, conventional rooftop ventilators have included projecting heights which are too high, multi-piece constructions which are difficult to install and unable to adapt to various roof pitches. Furthermore, rooftop ventilators must be of a sturdy construction to withstand the pressures of shipping and handling.

Conventional rooftop ventilators can be active or passive. Active rooftop ventilators can be powered by an artificial, electric power source and have electric fans or blowers designed to expel a greater airflow. Installation of these active ventilators includes a substantial initial investment due to the cost of the ventilator itself and the electrical wiring necessary for installation. Due to the artificial, electric power source, operation of these active ventilators increases the operating costs of a building. Moreover, the moving parts of the electric fans and blowers, such as the fan blades and rotors, used in the active rooftop ventilators need continual maintenance and repair. In addition, the electric fans and blowers add to the footprint of the ventilators on the roof, which can be especially problematic in residential apartment buildings and commercial apartment buildings where roof space is more limited than on industrial buildings.

Some passive rooftop ventilators can be as simple as louvers that merely allow the escape of heated air. Other passive ventilators utilize a rotating turbine fan that derives its rotational force from wind acting upon a radial array of fan blades. The rotational force creates the negative pressure necessary to vent indoor areas. However, these turbine ventilators typically do not create any negative force in low, i.e., 2 m/s, wind velocity. In addition, in greater wind velocity, the negative pressure created by these turbine ventilators is weak and the turbine ventilators are not able to create a positive pressure to force air into the indoor area as necessary.

SUMMARY

A wind-powered rooftop ventilator assembly is configured to create positive and negative pressures and includes a curved symmetrical cap defining a front opening. The curved symmetrical cap includes a first segment integral with a second segment. The first segment is angled substantially 125 degrees relative to a first horizontal plane and the second segment is angled substantially 34 degrees relative to a second horizontal plane that is different from and parallel to the first horizontal plane. The curved symmetrical cap is configured to create a positive pressure when wind flows against the front opening defined by the curved symmetrical cap and to create a negative pressure when wind flows against the back of the curved symmetrical cap.

The wind-powered rooftop ventilator can be configured to intake air into an indoor area when the wind flows against the front opening defined by the curved symmetrical cap and to exhaust air from an indoor area when the wind flows against the back of the curved symmetrical cap. A negative pressure area can be created at the front opening defined by the curved symmetrical cap when the wind flows against the back of the curved symmetrical cap. A separation point can be created in front of the front opening defined by the curved symmetrical cap when wind flows against the back of the curved symmetrical cap.

The back of the curved symmetrical cap can be located opposite of the front opening defined by the curved symmetrical cap. In some implementations, the first horizontal plane can intersect the proximal end of the curved symmetrical cap and the second horizontal plane can be located between the proximal end of the curved symmetrical cap and the distal end of the curved symmetrical cap.

In some implementations, the length of the first segment of the curved symmetrical cap can be smaller than the length of the second segment of the curved symmetrical cap. For example, the ratio of the length of the first segment of the curved symmetrical cap to the length of the second segment of the curved symmetrical cap can be 16.3:40.1.

In some implementations, the wind-powered rooftop ventilator can include a directional tail connected to the curved symmetrical cap. The curved symmetrical cap can be configured to create positive pressure when the directional tail is facing the back of the curved symmetrical cap and to create negative pressure when the directional tail is facing the front opening defined by the curved symmetrical cap. The directional tail can include a vertical fin and two or more horizontal fins that are perpendicular to the vertical fin. The directional tail can be connected to the curved symmetrical cap using one or more fasteners.

In some implementations, the distal end of the curved symmetrical cap can include a pointed tip. The thickness of the pointed tip can be different from the thickness of another region of the curved symmetrical cap In some implementations, the wind-powered rooftop ventilator can be configured to create positive and negative pressures without use of an external power source or fan.

In some implementations, the curved symmetrical cap can be connected to a bearing cavity that enables rotation of the curved symmetrical cap. In some implementations, the wind-powered rooftop ventilator can be made of plastic. In some implementations, the wind-powered rooftop ventilator can include a water cooler assembly that can be configured to cool air without the use of an external power source.

Details of one or more implementations of the wind-powered rooftop ventilator are set forth in the accompanying drawings and the description below. Other aspects that can be implemented will be apparent from the description and drawings, and from the claims.

DESCRIPTION OF DRAWINGS

Like reference symbols indicate like elements throughout the specification and drawings.

DETAILED DESCRIPTION

A wind-powered rooftop ventilator that can create both positive and negative pressures to enable the exhaust and intake of air is described. The wind-powered rooftop ventilator includes a symmetrical cap that is aerodynamically shaped such that, when wind flows against the back of the symmetrical cap, a negative pressure area is created at the front opening of the symmetrical cap, thereby enabling the exhaust of air from an indoor area. When wind flows against the front opening of the symmetrical cap, the wind is captured by the symmetrical cap, thereby enabling the intake of air into an indoor area. As such, the wind-powered rooftop ventilator can create both positive and negative pressures without use of an external power source, fan, and/or worm gear. The direction of the symmetrical cap with respect to the wind can be controlled by a directional tail, as described in greater detail below.

Figure 1:
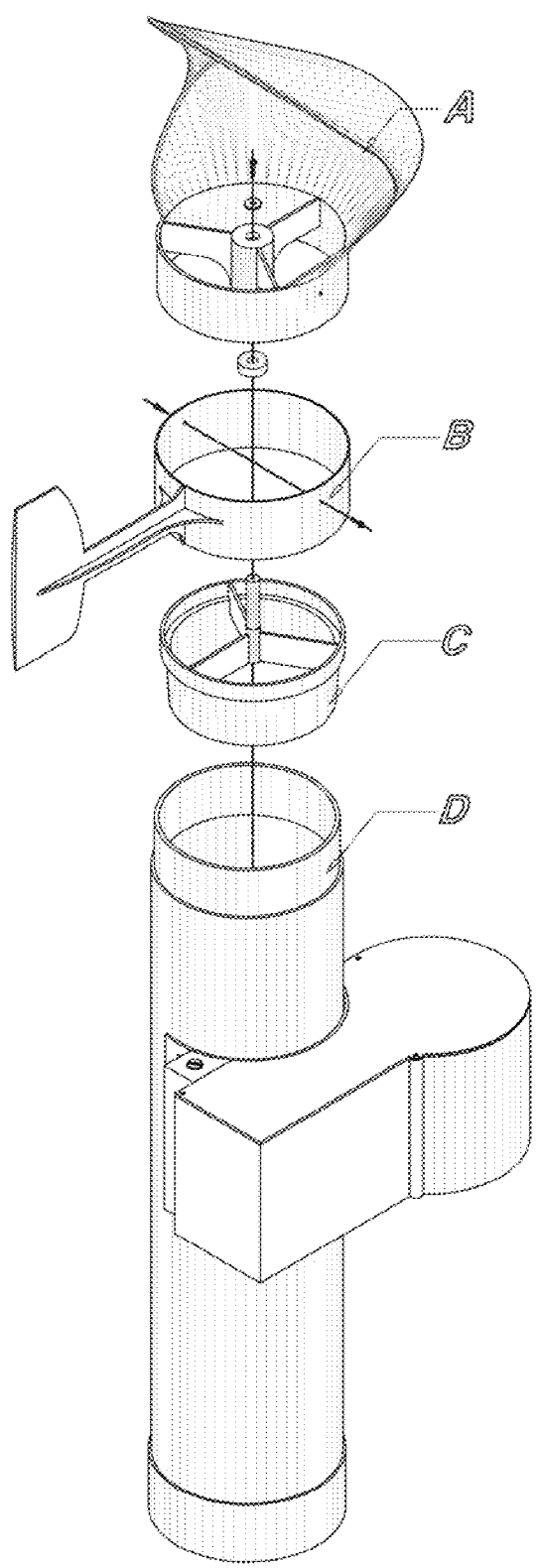
FIG. 1 is an example three-dimensional perspective view of an unassembled wind-powered ventilator and an assembled water cooler.

Referring to FIG. 1, the wind-powered rooftop ventilator includes a symmetrical cap portion A, a directional tail portion B, and a coupler C that is used to couple the symmetrical cap portion A and directional tail portion B to a water cooler assembly D or, alternatively, to a building pipe, shaft, or duct (not shown). The water cooler assembly D can cool air that enters the wind-powered rooftop ventilator for intake into an indoor area. In some implementations, such as the implementation illustrated in FIG. 1, the symmetrical cap portion A, the directional tail portion B, the coupler C, and the water cooler assembly D may be separate and discrete pieces that can be connected together using, for example, slip-fit engagement, adhesives, and/or fasteners, such as screws or nails. In other implementations, the symmetrical cap portion A, the directional tail portion B, the coupler C, and the water cooler assembly D can be integral with one another by, for example, having been molded together as one piece.

In some implementations, if wind is constantly blowing in a single direction, the wind-powered rooftop ventilator can include only the symmetrical cap portion A, as the directional tail portion B is not necessary to direct the symmetrical cap portion A towards the direction of the wind. In other implementations, the wind-powered rooftop ventilator can include only the symmetrical cap portion A and directional tail portion B, such that the directional tail portion B is directly connected to a building pipe, shaft, or duct. In yet other implementations, the wind-powered rooftop ventilator can include the symmetrical cap portion A, the directional tail portion B, and the coupler C, such that the wind-powered rooftop ventilator does not include a water cooler assembly D and, as such, the coupler C is directly connected to a building pipe, shaft, or duct. Such implementations may be preferred when the wind-powered rooftop ventilator is configured to exhaust air using negative pressure and, as such, the cooling of the air passing through the wind-powered rooftop ventilator is not beneficial. In still other implementations, the wind-powered rooftop ventilator can include only the symmetrical cap portion A, the directional tail portion B, and the water cooler assembly D, such that the directional tail portion B is directly connected to the water cooler assembly D or building pipe, shaft, or duct without use of the coupler C.

The symmetrical cap portion A, the directional tail portion B, the coupler C, and the water cooler assembly D can be made of one or more materials that are substantially resistant to deformation under wind pressure. In addition, because the wind-powered rooftop ventilator will be constantly exposed to weather elements, the one or more materials should also be resilient against deformation caused by the sun and temperatures changes. The one or more materials should also be smooth so as to minimize wind resistance against the wind-powered rooftop ventilator. The one or more materials can include plastic, such as, for example, polycarbonate, polypropylene, and/or nylon, metal, such as, for example, aluminum and/or stainless steel, fiberglass, or any other suitable material.

Figure 2:
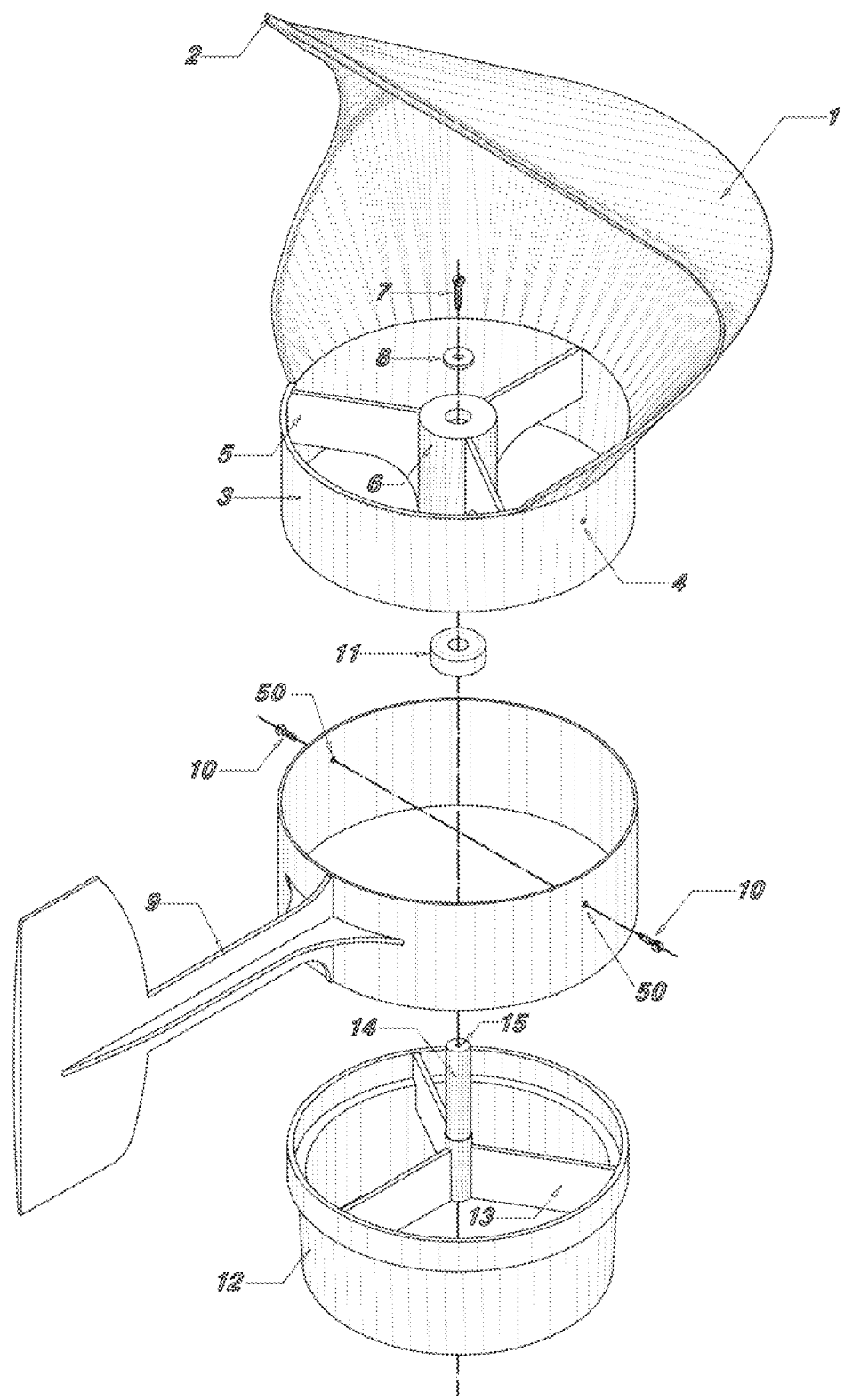
FIG. 2 is an exploded three-dimensional perspective view of the unassembled wind-powered ventilator of FIG. 1.

Referring to FIG. 2, the symmetrical cap portion A includes a symmetrical cap 1, a pointed tip 2 located at the distal end of the symmetrical cap 1, a first cylinder section 3, a pair of through holes 4 (one of which is not shown), radial spokes 5, a bearing cavity 6, a screw 7, and a washer 8. As described above, the symmetrical cap 1 has an aerodynamic shape such that, when wind flows against the back of the symmetrical cap 1, a negative pressure area is created at the front opening of the symmetrical cap 1 enabling the exhaust of air, and when wind flows against the front opening of the symmetrical cap 1, the wind is captured by the symmetrical cap 1, enabling the intake of air. When wind flows against the back of the symmetrical cap 1, a separation point is created in front of the front opening of the symmetrical cap 1 and a negative pressure zone, such as, for example, a cyclone, is created in front of the front opening of the symmetrical cap 1.

In addition, the symmetrical cap 1 can act to prevent external matter, such as rain, snow, and/or bird droppings, from entering a building pipe, shaft, or duct. The symmetrical cap 1 has a rounded shape, i.e., is curved, with a pointed tip 2 at its distal end. The thickness of the pointed tip 2 can be the same or different from that of the rest of the symmetrical cap 1. For example, in some implementations, such as the implementation illustrated in FIG. 4, the pointed tip 2 is thicker than the other regions of the symmetrical cap 1 so that wind flowing against the pointed tip 2 is directed in a more vertical direction. The thickness of the pointed tip 2 can range, for example, from 3 to 5 mm.

The symmetrical cap 1 is connected to or integral with the first cylinder section 3, which has a circular horizontal cross-section. The first cylinder section 3 includes a pair of through holes 4 (one of which is not shown) that are located along the same diameter at opposite sides of the first cylinder section 3. The pair of through holes 4 are aligned with a pair of through holes 50 of the directional tail portion B so as to connect the symmetrical cap portion A to the directional tail portion B.

The bearing cavity 6 is connected to the first cylinder section 3 using radial spokes 5. Although three radial spokes 5 are illustrated in FIG. 2, in some implementations, any number of two or more radial spokes can be used. The higher the number of spokes used, the greater the strength of the connection between the bearing cavity 6 and the first cylinder section 3. In some implementations, the bearing cavity 6 can include plural ball bearings to enable the symmetrical cap portion A to turn in any direction with low friction. In other implementations, the bearing cavity 6 can simply be a solid cylinder member having a circular through hole along its vertical axis that receives cylindrical member 14 of the coupler C. The screw 7 passes through the washer 8 to be inserted into the through hole 15 of the cylindrical member 14, as explained in greater detail below.

The directional tail portion B includes a directional tail 9 connected to or integral with a second cylinder section having a pair of through holes 50. In some implementations, the second cylinder section can be a partial cylinder, such that the second cylinder section has an incomplete, e.g., a substantially half-circular, horizontal cross-section. The proximal end of the directional tail 9 abuts the second cylinder section and the distal end of the directional tail 9 includes a vertical fin. Once the wind-powered rooftop ventilator is assembled, the directional tail 9 can rotate 360 degrees about the cylindrical member 14 of the coupler C so that the vertical fin is always parallel to the direction of the wind.

The through holes 4 of the symmetrical cap portion A are aligned with the through holes 50 of the directional tail portion B and screws 10 are used to connect the symmetrical cap portion A to the directional tail portion B. As such, the symmetrical cap portion A cannot rotate about the directional tail portion B so that the directional tail 9 can maintain either the back side or front opening of the symmetrical cap 1 in a direction parallel to the direction of the wind.

In some implementations, such as the implementation illustrated in FIG. 2, the directional tail 9 also includes two horizontal fins protruding perpendicularly from opposite sides of the directional tail 9 along a portion of the proximal to distal axis of the directional tail 9. In other implementations, the directional tail 9 may not include horizontal fins.

In some implementations, such as the implementation illustrated in FIG. 2, the horizontal length of the directional tail 9 along the proximal to distal axis of the directional tail 9 is greater than the vertical length of the vertical fin of the directional tail 9. In other implementations, the vertical length of the vertical fin of the directional tail 9 can be greater than the horizontal length of the directional tail 9 along the proximal to distal axis of the directional tail 9.

The coupler C includes a third cylinder section 12, radial spokes 13, and a cylindrical member 14 defining the through hole 15. Although three radial spokes 13 are illustrated in FIG. 2, in some implementations, any number of two or more radial spokes can be used. The higher the number of spokes used, the greater the strength of the connection between the cylindrical member 14 and the third cylinder section 12. The cylindrical member 14 is configured to pass through the bearing 11 into the bearing cavity 6 of the symmetrical cap portion A, such that the top surface of the cylindrical member 14 is aligned with the top surface of the bearing cavity 6. The screw 7 can then be inserted through the washer 8 into the through hole 15 for assembly of the wind-powered rooftop ventilator. Once assembled, the cylindrical member 14 can freely rotate within the bearing cavity 6 so that the symmetrical cap portion A and the directional tail portion B can together rotate relative to the coupler C.

In some implementations, the through hole 15 can extend along the entire vertical length of the cylindrical member 14. In other implementations, the through hole 15 can extend along only a portion of the vertical length of the cylindrical member 14 sufficient to receive the entirety of the screw 7.

In summary, to assemble the wind-powered rooftop ventilator, the symmetrical cap portion A can be connected to the directional tail portion B using screws 10. The cylindrical member 14 of the coupler C can then be passed through the directional tail portion B and connected to the symmetrical cap portion A using washer 8, bearing 11, and screw 7.

Figure 3A:
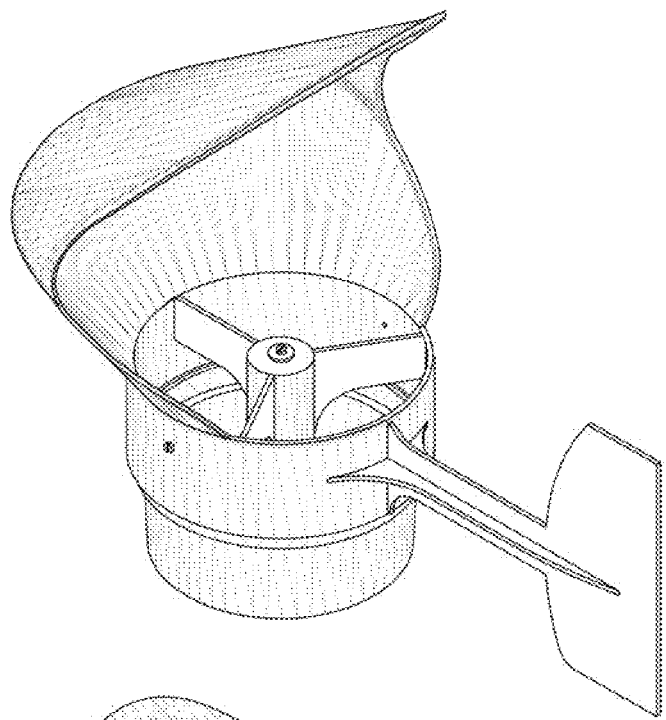
FIG. 3a is an example three-dimensional perspective view of an assembled wind-powered ventilator of FIG. 2 configured to create negative pressure.

To configure the wind-powered rooftop ventilator to create negative pressure, the directional tail portion B is connected to the symmetrical cap portion A such that the directional tail 9 is facing the front opening defined by the symmetrical cap 1 as illustrated in FIG. 3a, for example. In such a configuration, the back side of the symmetrical cap 1 will be facing the wind direction, thereby generating a negative pressure area at the front opening of the symmetrical cap 1.

Figure 3B:
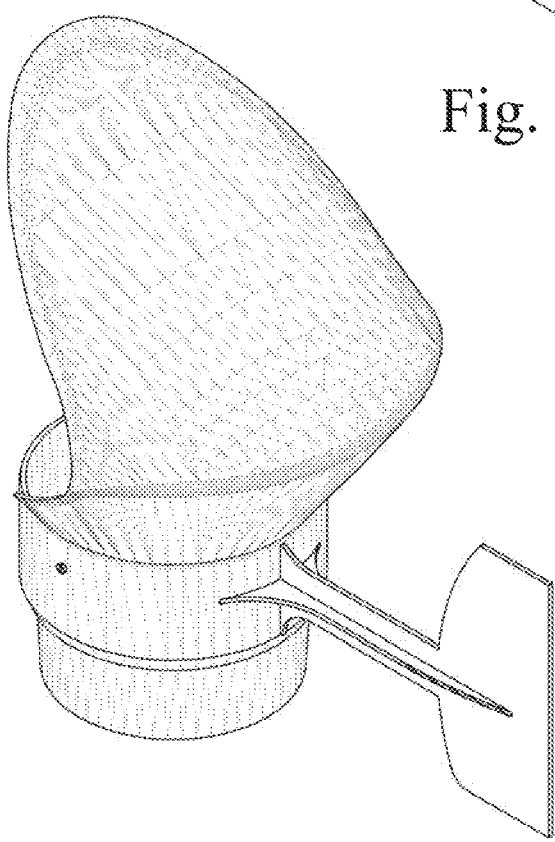
FIG. 3b is an example three-dimensional perspective view of an assembled wind-powered ventilator of FIG. 2 configured to create positive pressure.

To configure the wind-powered rooftop ventilator to create positive pressure, the directional tail portion B is connected to the symmetrical cap portion A such that the directional tail 9 is facing the back side of the symmetrical cap 1 as illustrated in FIG. 3b, for example. In such a configuration, the front opening of the symmetrical cap 1 will be facing the wind direction, thereby capturing the wind and generating positive pressure at the front opening of the symmetrical cap 1.

Figure 4:
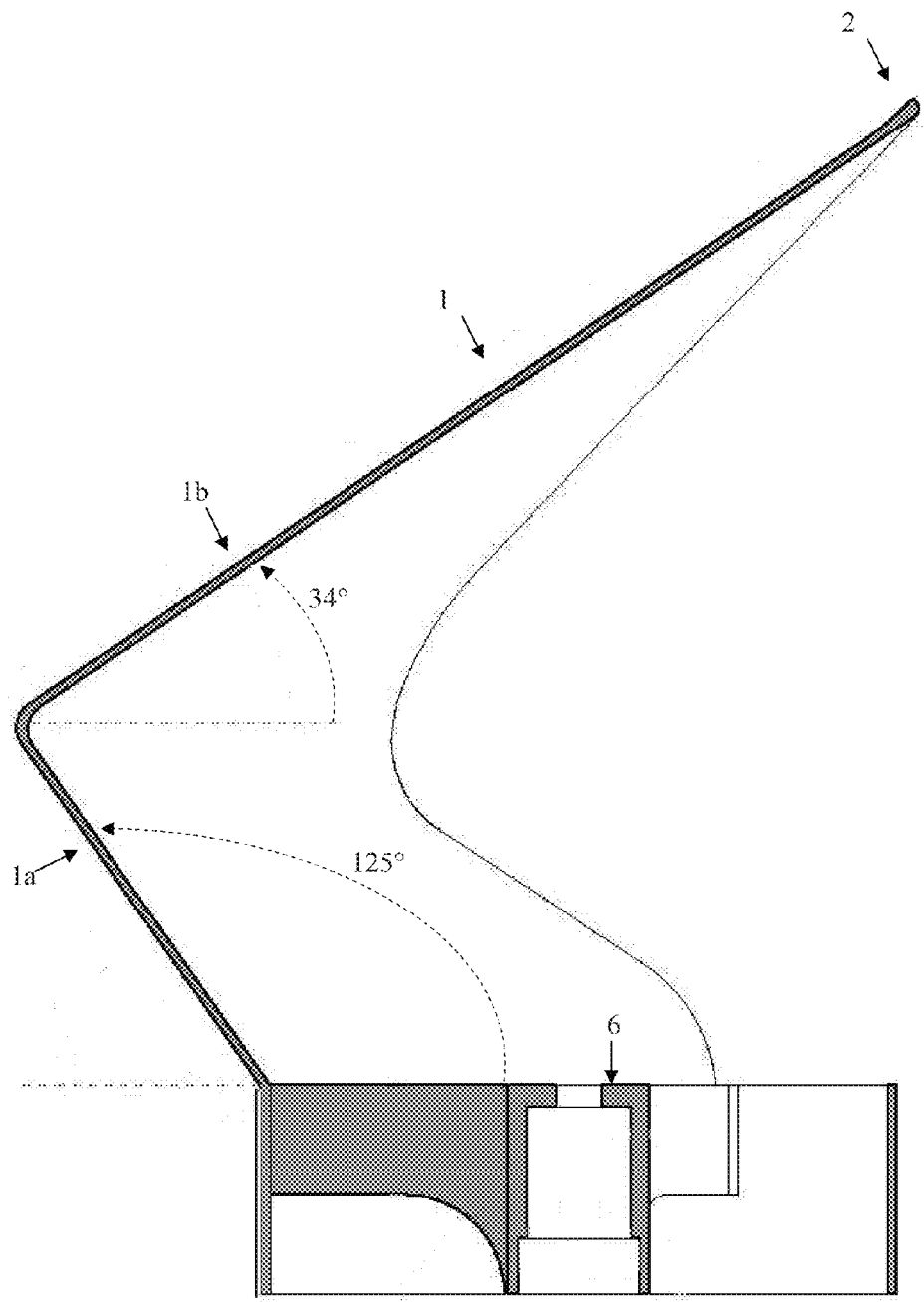
FIG. 4 is a cross-sectional view of a symmetrical cap portion of the unassembled wind-powered ventilator of FIG. 2.

FIG. 4 is a cross-sectional view of the symmetrical cap portion A taken along the center, distal to proximal axis of the symmetrical cap portion A. The symmetrical cap 1 includes two segments 1a and 1b. As illustrated in FIG. 4, the first segment 1a is angled substantially 125 degrees relative to a first horizontal plane perpendicular to the distal to proximal axis of the symmetrical cap portion A, and intersecting proximal end of the symmetrical cap 1. In some implementations, the first segment 1a can be angled from 115 to 135 degrees relative to a first horizontal plane perpendicular to the distal to proximal axis of the symmetrical cap portion A, and intersecting proximal end of the symmetrical cap 1. The second segment 1b is angled substantially 34 degrees relative to a second horizontal plane parallel to the first horizontal plane and located between the proximal end of the symmetrical cap 1 and the distal end of the symmetrical cap 1. In some implementations, the second segment 1b can be angled from 30 to 40 degrees relative to a second horizontal plane parallel to the first horizontal plane and located between the proximal end of the symmetrical cap 1 and the distal end of the symmetrical cap 1. Through extensive experimentation, the angles illustrated in FIG. 4 give the symmetrical cap 1 the aerodynamic shape necessary to enable the creation of positive and negative pressures and to maximize the intake and exhaust of air without use of an external power source, fan, and/or worm gear, or moving parts, such as fan blades.

The symmetrical cap 1 extends along substantially 120 degrees of the first cylinder section 3 and is symmetrical about its center vertical axis. In some implementations, the symmetrical cap 1 can extend along substantially 100 to 160 degrees of the first cylinder section 3.

The length of the first segment 1a is shorter than the length of the second segment 1b. In some implementations, for example, the length of the first segment can be 81.5 mm and the length of the second segment can be 200.5 mm. As such, the ratio of the length first segment 1a to the length of the second segment is 16.3:40.1. Although the size of the symmetrical cap 1 can be changed in other implementations, the angles of the first and second segments 1a and 1b and the ratio of the length of the first segment 1a to the length of the second segment 1b should be maintained so that the aerodynamic characteristics of the symmetrical cap 1 described above are not altered.

Figure 5:
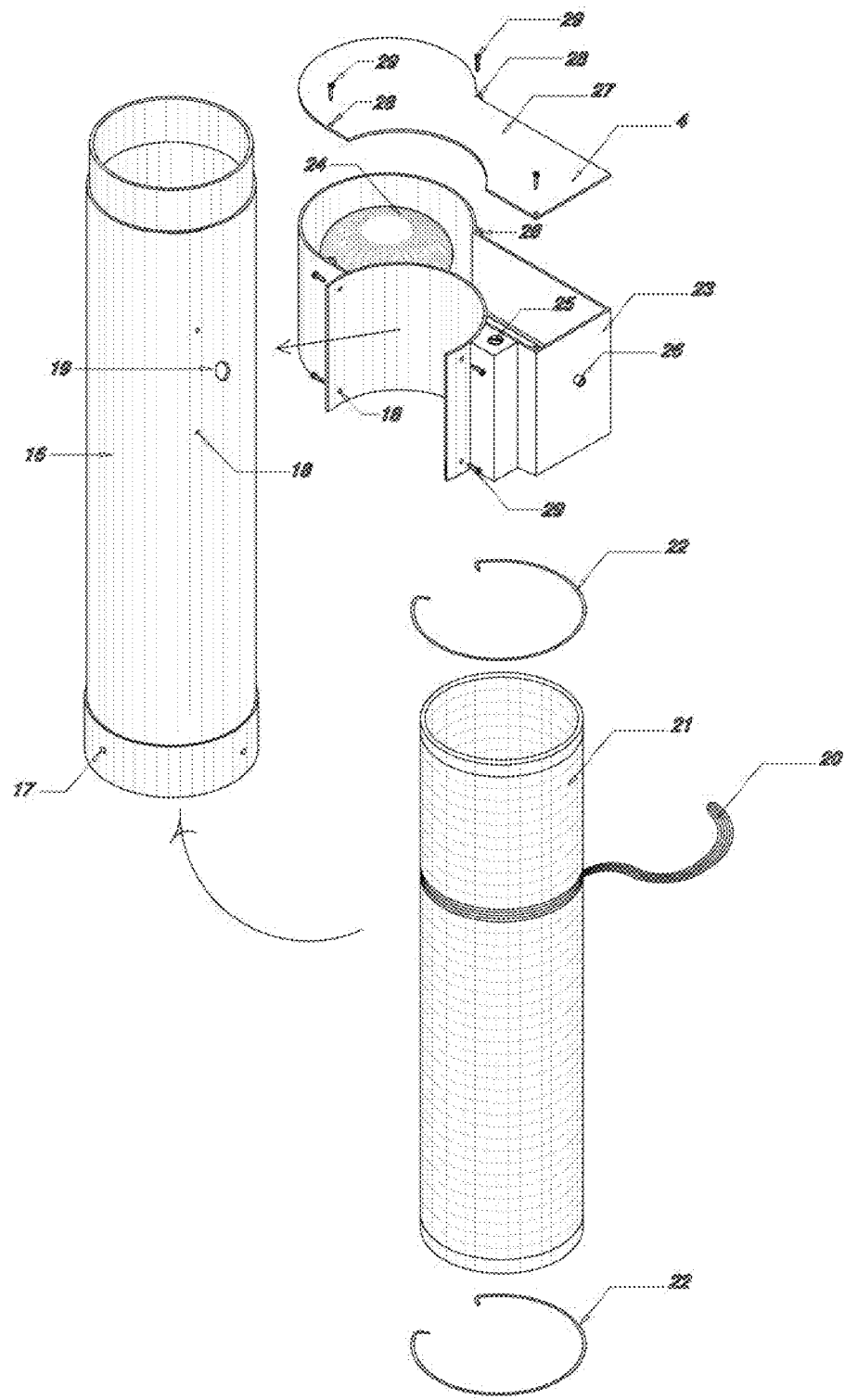
FIG. 5 is an exploded three-dimensional perspective view of an unassembled water cooler of FIG. 1.

Referring to FIG. 5, the water cooler assembly D includes a fourth cylinder section 16, through holes 17, a through hole 18, a through hole 19, a wick 20, a fabric 21 that can absorb water, holders 22, and a water tank 23. The wick 20 and fabric 21 can be made from an absorbent material, such as, for example, cotton. The distal end of the fourth cylinder section 16 is configured to be connected to the coupler C, as illustrated in, for example, FIG. 1, or, alternatively, to be connected directly to the directional tail portion B if the wind-powered rooftop ventilator does not include a coupler C. The proximal end of the fourth cylinder section 16 is configured to be connected to a building pipe, shaft, or duct (not shown).

The fabric 21 receives moisture from wick 20 which is wrapped around a region of the fabric 21 so that the fabric 21 continuously remains moist. The holders 22 are connected to the distal and proximal ends of the fabric 21 to aid in insertion and removal of the fabric 21 within the fourth cylinder section 16. Once the fabric 21 has been inserted against the interior surface of the fourth cylinder section 16, air passing through the fourth cylinder section 16 and against the moist fabric 21 will be naturally cooled. The wick 20 is passed through the through hole 19 of the fourth cylinder section 16 to remain in contact with water from the water tank 23.

The water tank 23 includes a water level control valve 24, a humidity control valve 25, a hose connector 26, a water tank hood 27, through holes 28, and screws 29. Water originates from a hose (not shown) and enters the water tank 23 through the hose connector 26. The amount of water stored in the water tank 23 is controlled by the water level control valve 24. The rate and/or amount of water that is permitted to contact the wick 20 is controlled by the humidity control valve 25, such that the greater the amount of water permitted to flow to the wick 20, the more humid the air passing through the fourth cylinder section 16 will be. The water tank hood 27 is secured to the water tank 23 using screws 29 screwed into through holes 29 to prevent debris or other external matters from entering the water tank 23. The water tank 23 is connected to the fourth cylinder section 16 using screws 29 screwed into through holes 18.

Because air flow through the water cooler assembly D is caused by the positive and/or negative pressure created by the wind-powered rooftop ventilator, the water cooler assembly D can cool air without use of an external power source, fan, and/or worm gear. As such, air can be cooled and forced into an indoor area without the use of electricity.

The wind-powered rooftop ventilator disclosed in this application provides many advantages over previous ventilators. For example, as described above, the wind-powered rooftop ventilator disclosed in this application can enable both the exhaust of air from and intake of air into an indoor area without the use of an external power source, fan, and/or worm gear, or moving parts, such as fan blades, resulting in greater reliability and lower maintenance costs. Thereby, the wind-powered rooftop ventilator disclosed in this application aids in electricity conservation and is noiseless. Moreover, due to elegant, aerodynamic design of the symmetrical cap, the wind-powered rooftop ventilator has fewer parts and required less material and can, as such, be manufactured for a lower cost. Moreover, the wind-powered rooftop ventilator disclosed in this application can work on any roof, no matter its slope, and in any wind condition.

In addition, the wind-powered rooftop ventilator disclosed in this application can exhaust and intake air at much higher rates than previously known ventilators. For example, in experiments comparing the air velocity created by the wind-powered rooftop ventilator disclosed in this application and a previous turbine ventilator in different wind conditions, the air velocity created by the wind-powered rooftop ventilator disclosed in this application was always greater, as can be seen from the collected data below:

| Wind Speed (m/s) | Air Intake Speed of the disclosed ventilator (m/s) | Air Exhaust Speed of the disclosed ventilator (m/s) | Air Exhaust Speed of a prior turbine ventilator (m/s) |
|---|---|---|---|
| 1 | 0.9 | 0.6 | 0.0 |
| 2 | 1.8 | 1.3 | 0.0 |
| 3 | 2.5 | 1.7 | 0.2 |
| 4.2 | 3.2 | 2.2 | 0.9 |
| 5.4 | 4.6 | 3.3 | 1.3 |

Furthermore, it should be noted that the prior turbine ventilator was completely ineffective when the wind speed was under 2 m/s, whereas the wind-powered rooftop ventilator disclosed in this application is effective at any wind speed, thereby enabling use of the wind-powered rooftop ventilator disclosed in this application in a higher number of geographic regions.

It is to be understood the implementations are not limited to the particular devices or apparatus described which may, of course, vary. For example, although the ventilator has been described for use on rooftops of buildings, the ventilator can also be used with other tools requiring a suction or vacuum effect.

It is also to be understood that the terminology used herein is for the purpose of describing particular implementations only, and is not intended to be limiting. As used in this specification, the singular forms "a", "an" and "the" include plural referents unless the content clearly indicates otherwise.

Accordingly, other implementations are within the scope of this application.

What is claimed is:

1. A wind-powered rooftop ventilator that is configured to create positive and negative pressure zones, the wind-powered rooftop ventilator comprising:
a curved symmetrical cap comprising a first segment integral with a second segment, wherein:
the curved symmetrical cap defines a front opening, the first segment is angled substantially 125 degrees relative to a first horizontal plane,
the second segment is angled substantially 34 degrees relative to a second horizontal plane that is different from and parallel to the first horizontal plane,
the curved symmetrical cap is configured to create positive pressure zone in front of the front opening when wind flows against the front opening defined by the curved symmetrical cap,
the curved symmetrical cap is configured to create a negative pressure zone in front of the front opening when wind flows against the back of the curved symmetrical cap, and
a directional tail connected to the curved symmetrical cap, the directional tail comprising a vertical fin and two or more horizontal fins that are perpendicular to the vertical fin, wherein the directional tail is selectively configurable such that:
In a first configuration the curved symmetrical cap is configured to create the positive pressure zone when the directional tail extends radially rearward from the back of the curved symmetrical cap, and
In a second configuration, the curved symmetrical cap is configured to create the negative pressure zone when the directional tail extends radially forward from the front opening defined by the curved symmetrical cap, and
the wind-powered rooftop ventilator is configured to created the positive and negative pressure zones without use of a fan or an external power source.

2. The wind-powered rooftop ventilator of claim 1, wherein the ratio of the length of the first segment of the curved symmetrical cap to the length of the second segment of the curved symmetrical cap is 16.3:40.1.

3. The wind-powered rooftop ventilator of claim 1, wherein the back of the curved symmetrical cap is located opposite of the front opening defined by the curved symmetrical cap.

4. The wind-powered rooftop ventilator of claim 1, wherein the wind-powered rooftop ventilator is configured to intake air into an indoor area when the wind flows against the front opening defined by the curved symmetrical cap.

5. The wind-powered rooftop ventilator of claim 1, wherein the wind-powered rooftop ventilator is configured to exhaust air from an indoor area when the wind flows against the back of the curved symmetrical cap.

6. The wind-powered rooftop ventilator of claim 1, wherein the wind-powered rooftop ventilator is made of plastic.

7. The wind-powered rooftop ventilator of claim 1, wherein the curved symmetrical cap comprises a pointed tip.

8. The wind-powered rooftop ventilator of claim 7, wherein the thickness of the pointed tip is different from the thickness of another region of the curved symmetrical cap.

9. The wind-powered rooftop ventilator of claim 1, wherein the curved symmetrical cap is connected to a bearing cavity that enables rotation of the curved symmetrical cap.

10. The wind-powered rooftop ventilator of claim 1, wherein a separation point is configured to be created in front of the front opening defined by the curved symmetrical cap when wind flows against the back of the curved symmetrical cap.

\* \* \* \* \*